(12) United States Patent
Murabayashi et al.

(10) Patent No.: US 8,944,268 B2
(45) Date of Patent: Feb. 3, 2015

(54) FUEL TANK

(75) Inventors: Shinya Murabayashi, Utsunomiya (JP);
Takeaki Nakajima, Tochigi-ken (JP);
Kiyofumi Shida, Tochigi-ken (JP);
Hiroaki Watanabe, Utsunomiya (JP);
Yutaka Utsumi, Sakura (JP); Kengo Kobayashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 196 days.

(21) Appl. No.: 13/147,223

(22) PCT Filed: Feb. 2, 2010

(86) PCT No.: PCT/JP2010/051382
§ 371 (c)(1),
(2), (4) Date: Aug. 1, 2011

(87) PCT Pub. No.: WO2010/090165
PCT Pub. Date: Aug. 12, 2010

(65) Prior Publication Data
US 2011/0290793 A1    Dec. 1, 2011

(30) Foreign Application Priority Data
Feb. 5, 2009 (JP) ................................. 2009-024992

(51) Int. Cl.
*F02M 37/14* (2006.01)
*F02M 37/00* (2006.01)
*B60K 15/077* (2006.01)
*F02M 37/02* (2006.01)
*F02M 37/10* (2006.01)

(52) U.S. Cl.
CPC .......... *F02M 37/0094* (2013.01); *B60K 15/077* (2013.01); *F02M 37/0023* (2013.01); *F02M 37/025* (2013.01); *F02M 37/103* (2013.01); *F02M 37/106* (2013.01)
USPC ..................... 220/4.14; 220/562; 137/565.22; 137/448; 123/509

(58) Field of Classification Search
USPC ................. 220/4.14, 564, 562; 123/509, 514; 137/143, 565.22, 448; 141/126, 230, 141/323
See application file for complete search history.

(56) References Cited

U.S. PATENT DOCUMENTS 2,646,061 A    7/1953   Bottum
5,078,169 A *  1/1992   Scheurenbrand et al. .... 137/574
(Continued)

FOREIGN PATENT DOCUMENTS

DE    43 37 183 A1    5/1995
DE    199 00 378 A1   7/2000
(Continued)

*Primary Examiner* — Anthony Stashick
*Assistant Examiner* — Robert Poon
(74) *Attorney, Agent, or Firm* — Carrier Blackman & Associates, P.C.; Joseph P. Carrier; Fulchand P. Shende

(57) ABSTRACT

A fuel introducing member is connected to an opening end of a siphon pipe forming a fuel tank. The fuel introducing member has an opening for introducing fuel within the tank, and the opening is formed in the upper surface of a cover section. A lid body is pivotably mounted to the upper surface. When the opening is above the level of fuel, the lid body closes the opening by the weight of the lid body, and when the opening is below the level of the fuel, the lid body floats in the fuel to open the opening. The opening is located below the upper end of the inner diameter of the opening end of the siphon pipe.

5 Claims, 18 Drawing Sheets

(56) References Cited

U.S. PATENT DOCUMENTS

| | | | |
|---|---|---|---|
| 5,170,764 A | 12/1992 | Tuckey | |
| 5,363,827 A | 11/1994 | Siekmann | |
| 5,724,947 A | 3/1998 | Takaki et al. | |
| 5,979,485 A | 11/1999 | Tuckey et al. | |
| 6,276,342 B1 * | 8/2001 | Sinz et al. | 123/514 |
| 6,505,644 B2 | 1/2003 | Coha et al. | |
| 6,607,005 B2 * | 8/2003 | Viebahn et al. | 137/574 |
| 6,863,084 B2 * | 3/2005 | Aschoff | 137/565.22 |
| 6,871,640 B2 | 3/2005 | Atwood et al. | |
| 6,955,158 B2 | 10/2005 | Rumpf | |
| 7,007,675 B2 * | 3/2006 | Ida et al. | 123/468 |
| 7,069,913 B1 | 7/2006 | Crary | |
| 7,284,540 B2 * | 10/2007 | Attwood et al. | 123/509 |
| 7,730,877 B2 * | 6/2010 | Suda et al. | 123/509 |
| 2003/0127134 A1 * | 7/2003 | Mills | 137/202 |
| 2004/0182454 A1 * | 9/2004 | Atwood et al. | 137/574 |
| 2005/0051141 A1 * | 3/2005 | Rumpf | 123/514 |
| 2011/0290793 A1 | 12/2011 | Murabayashi et al. | |

FOREIGN PATENT DOCUMENTS

| | | |
|---|---|---|
| DE | 10 2006 059 967 A1 | 6/2008 |
| JP | 63-104671 U | 7/1988 |
| JP | 64-028318 U | 2/1989 |
| JP | 10-061515 A | 3/1998 |
| JP | 2007-051633 A | 3/2007 |

* cited by examiner

FUEL TANK

TECHNICAL FIELD

The present invention relates to a fuel tank including a first reservoir for reserving fuel, a second reservoir for reserving the fuel, and a siphon tube which extends between the first reservoir and the second reservoir and which is evacuated by a negative pressure generator.

BACKGROUND ART

Fuel tanks are used to supply fuel to internal combustion engines. For example, 4WD (four-wheel-drive) vehicles and FR (front engine, rear wheel drive) vehicles use a so-called saddle fuel tank, the bottom of which is upwardly recessed at the center portion in the width direction of the vehicle, in order for the fuel tank to avoid physical interference with the propeller shaft, which extends down the middle of the vehicle.

The saddle fuel tank is generally divided into a first reservoir for reserving fuel and a second reservoir for reserving the fuel, and each of the first reservoir and the second reservoir is equipped with one fuel pumping system. Accordingly, the saddle fuel tank requires the two fuel pumping systems in comparison with fuel tanks for use in 2WD (two-wheel-drive) vehicles, and thus it is more costly and larger.

There is known a fuel tank level equalizer system as disclosed in Japanese Laid-Open Patent Publication No. 10-061515 (hereinafter referred to as a "conventional art"). As shown in FIG. 18 of the accompanying drawings, the fuel tank level equalizer system according to the conventional art includes a fuel tank 1 having two separate sections 1a, 1b, and operates to equalize fuel levels in the separate sections 1a, 1b through a siphon 2.

The separate section 1b houses therein a fuel pump module 3 which has an outlet connected to a bypass pressure regulator 4. The regulator 4 has an outlet connected to a conduit 5 through which a liquid fuel is supplied to a nozzle 6a of a jet pump 6. The jet pump 6 is operated by the liquid fuel that is supplied to the nozzle 6a, drawing the fuel from fuel pickups 2a, 2b of the siphon 2 through the siphon 2.

The fuel levels in the separate sections 1a, 1b are thus equalized through the siphon 2, and a single fuel level sensor 7 can monitor all the fuel levels in the vehicle.

SUMMARY OF THE INVENTION

In the above fuel tank 1, each of the fuel pickups 2a, 2b includes a flow valve assembly, not shown, which is actuated by a filter and a diaphragm. The filter is made of a flexible material having small openings, and the filter, when wetted, prevents air from flowing therethrough due to the capillary action of the liquid fuel. When there is no liquid fuel in the inlets of the fuel pickups, air is prevented from flowing therethrough by a liquid capillary seal of the filter.

However, the fuel tank level equalizer system according to the conventional art is made up of a number of components and is complex in structure because the system includes actuating parts such as the filter having the small openings, the diaphragm, etc., and also includes the flow valve assembly. Therefore, the fuel tank level equalizer system according to the conventional art is costly to manufacture, and is low in productivity and endurance reliability. Furthermore, the fuel undergoes a large pressure loss because it flows through the filter having the small openings, resulting in a reduced siphon transfer speed. Accordingly, the filter tends to be clogged with dirt and also tend to be damaged.

In addition, since the fuel tank level equalizer system according to the conventional art has a liquid filter structure, the filter fails to provide a sealing function when it is dry, not wet. When the filter is dry, it does not prevent air from flowing therethrough, and thus the filter does not provide a stable siphon effect. For example, if the fuel is present in only the separate section 1a, then no siphon effect is provided, and the fuel levels in the separate sections 1a, 1b can not be equalized.

The present invention has been made in an effort to solve the above problems. It is an object of the present invention to provide a fuel tank which is capable of providing a desired siphon effect and using fuel in the fuel tank efficiently with a simple and economic structure.

According to the present invention, there is provided a fuel tank including a first reservoir for storing fuel, a second reservoir for storing the fuel, and a siphon tube which extends between the first reservoir and the second reservoir and which is evacuated by a negative pressure generator.

The fuel tank comprises a fuel introducing member connected to at least one open end of the siphon tube, wherein the fuel introducing member includes an opening for introducing the fuel therethrough, and a lid for closing the opening under its own weight of the lid when the opening is positioned above the liquid level of the fuel, and the opening is disposed below the at least one open end of the siphon tube.

According to the present invention, the fuel introducing member, which is connected to at least one open end of the siphon tube, includes the opening for introducing the fuel in the fuel tank therethrough, and the opening is disposed below the upper end of the inner diameter of the one open end of the siphon tube. Therefore, the fuel can effectively be siphoned until the fuel level becomes lower than the upper end of the inner diameter of the at least one open end of the siphon tube. The fuel in the fuel tank can thus be used efficiently with a simple and economical structure.

DESCRIPTION OF THE EMBODIMENTS

Figure 1:
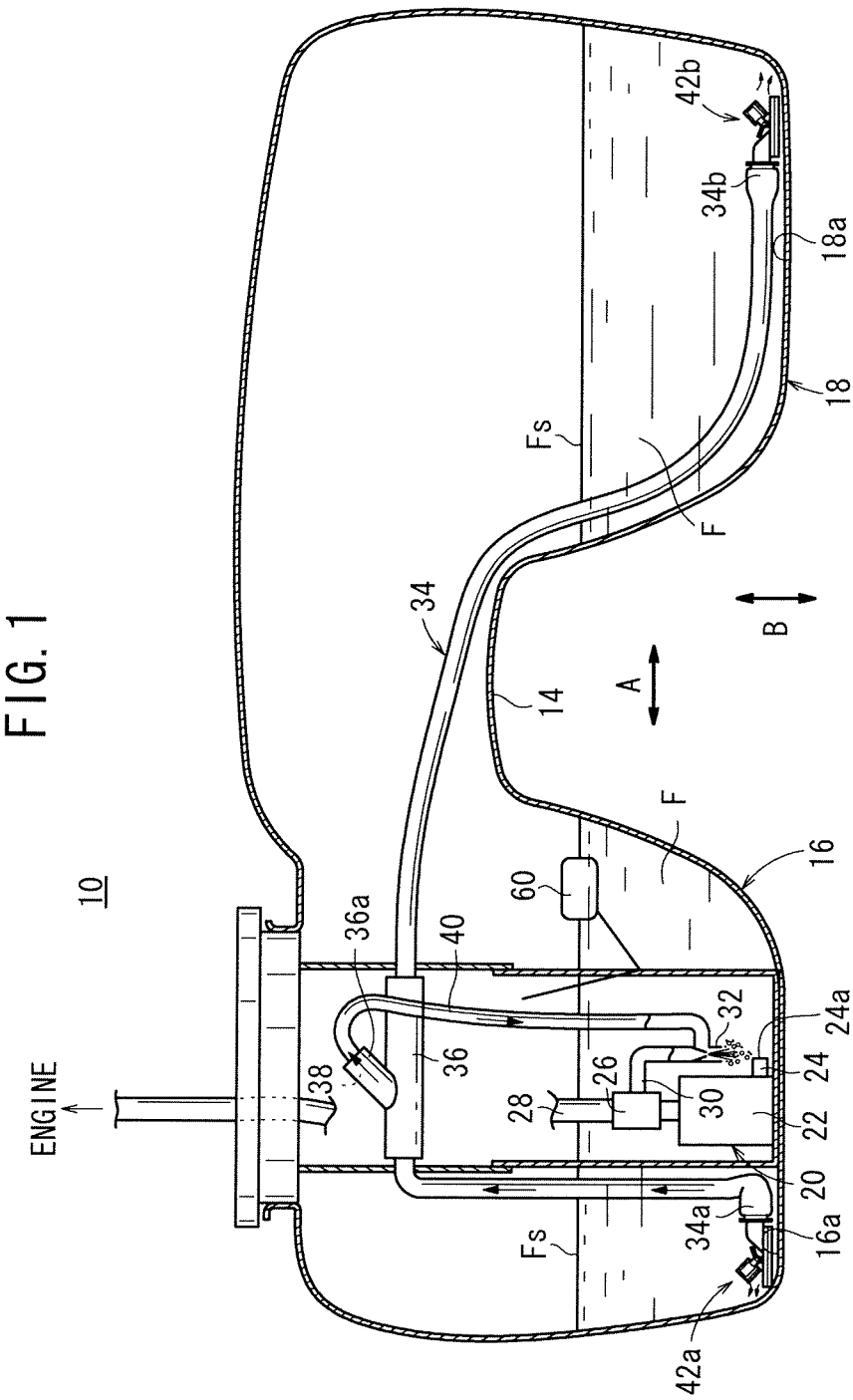
FIG. 1 is a schematic structural view of a fuel tank according to a first embodiment of the present invention.

As shown in FIG. 1, a fuel tank 10 according to a first embodiment of the present invention comprises a saddle fuel tank, and is mounted on a vehicle, not shown. The fuel tank 10 includes an upwardly curved saddle 14 on its bottom substantially centrally in the width direction (indicated by the arrow A) of the vehicle. The saddle 14 defines a main tank (first reservoir) 16 and a sub-tank (second reservoir) 18 in the fuel tank 10.

A fuel pump module 20 is disposed in the main tank 16. The fuel pump module 20 comprises a fuel pump 22 including a pumping jet pump 24 which has a fuel inlet port 24a that is open toward the bottom of an inner surface 16a of the main tank 16 and also including a pressure regulator 26 connected to an outlet of the fuel pump 22.

The pressure regulator 26 supplies a fuel F to an engine, not shown, through a fuel pipe 28, and has a suction branch pipe 30 extending therefrom. The branch pipe 30 has a distal end (lower end) connected to a suction jet pump 32 as a negative pressure generator.

The fuel tank 10 houses therein a siphon tube 34 extending over the bottoms of inner surfaces 16a, 18a of the main tank 16 and the sub-tank 18. The siphon tube 34 includes a three-way joint 36 in its upper portion which includes a suction connector 36a having a check valve 38 disposed therein. The suction connector 36a is connected to an end of a suction tube 40, which has the other end connected to a suction side (negative pressure side) of the suction jet pump 32.

Figure 2:
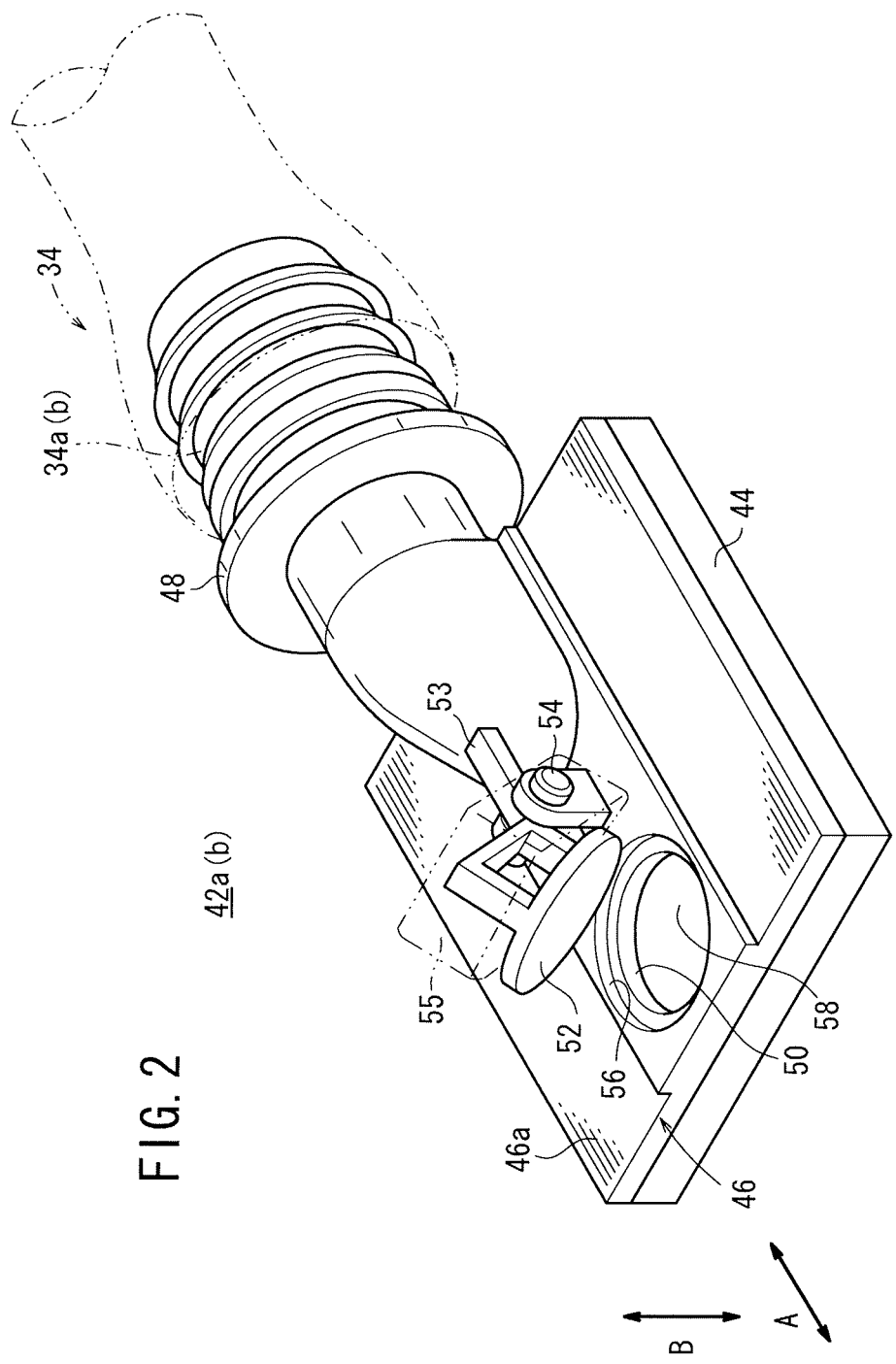
FIG. 2 is a perspective view of a fuel introducing member in the fuel tank.
Figure 3:
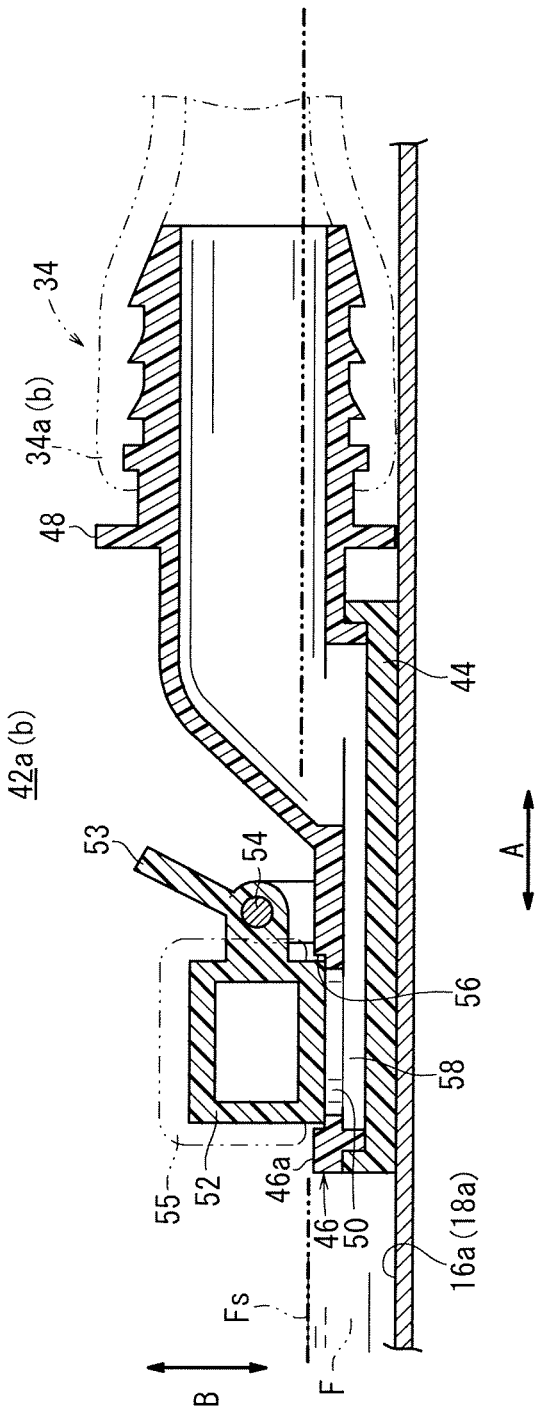
FIG. 3 is a sectional side elevational view of the fuel introducing member.

The siphon tube 34 has an open end 34a disposed in the main tank 16 and directed in a width direction of the vehicle incorporating the fuel tank 10. A fuel introducing member 42a is connected to the open end 34a. As shown in FIGS. 2 and 3, the fuel introducing member 42a is of a hollow three-dimensional shape, e.g., a hollow rectangular parallelepiped, which is short in height directions, i.e., in the directions indicated by the arrow B. The fuel introducing member 42a basically comprises a base assembly including a base member 44 (also referred to as a base 44) in the form of a square tray and a substantially rectangular cover member 46 (also referred to as a cover 46) mounted on the base 44.

The cover 46 includes a joint 48 which is formed integrally with the cover 46. To the joint 48, the open end 34a of the siphon tube 34 is connected. The cover 46 has a circular opening 50 defined in an upper surface 46a thereof which is disposed below the upper end of an inner diameter of the open end 34a of the siphon tube 34 (see FIG. 3).

The opening 50, which serves to introduce the fuel F from the main tank 16, is selectively opened and closed by a lid 52. The lid 52 is vertically openably and closably supported on the upper surface 46a of the cover 46 by a pivot shaft 54. If necessary, a float (floating member) 55 may be mounted on the lid 52. When the opening 50 is positioned above the liquid level Fs of the fuel F, the lid 52 closes the opening 50 under its own weight. When the opening 50 is positioned below the liquid level Fs of the fuel F, the lid 52 floats in the fuel F, and then opens the opening 50.

If the lid 52 itself has the above function, then the float 55 may be dispensed with. The lid 52 has a stopper 53 formed integrally therewith for regulating an open position (angular position for its swinging movement) of the lid 52.

The upper surface 46a of the cover 46 has a groove 56 defined therein around the opening 50. The base 44 and the cover 46 define a fuel channel 58 therebetween which connects the opening 50 and the open end 34a of the siphon tube 34 to each other.

Figure 4:
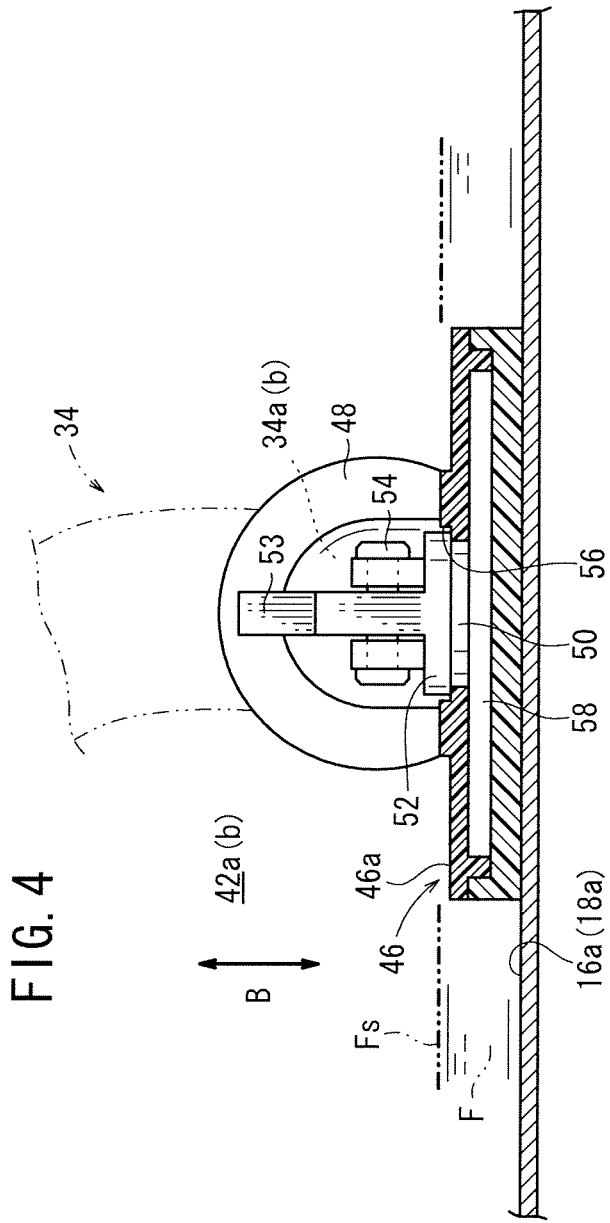
FIG. 4 is a front elevational view, partly in cross section, of the fuel introducing member.

As shown in FIGS. 3 and 4, the fuel channel 58 has an opening area which is equal to or greater than the opening area of the opening 50. The opening area of the opening 50 and the opening area of the fuel channel 58 are equal to or greater than the opening area of the open end 34a of the siphon tube 34.

As shown in FIG. 1, the siphon tube 34 has an open end 34b disposed in the sub-tank 18. A fuel introducing member 42b is connected to the open end 34b. The fuel introducing member 42b is identical in structure to the fuel introducing member 42a. Those parts of the fuel introducing member 42b which are identical to those of the fuel introducing member 42a are denoted by identical reference characters, and will not be described below (see FIGS. 2 through 4). At least one of the fuel introducing members 42a, 42b may be employed.

The fuel pump module 20 includes a float 60 for detecting the position of the liquid level Fs of the fuel F stored in the main tank 16.

Operation of the fuel tank 10 will be described below.

When the fuel pump 22 of the fuel pump module 20 is actuated, the fuel F stored in the main tank 16 is drawn from the fuel inlet port 24a by the pumping jet pump 24.

The fuel F is supplied from the pressure regulator 26 through the fuel pipe 28 to the engine, and is also supplied through the branch pipe 30 to the suction jet pump 32, developing a negative pressure in the suction tube 40. Since the suction tube 40 is connected to the siphon tube 34 through the three-way joint 36, the siphon tube 34 is evacuated.

Figure 5:
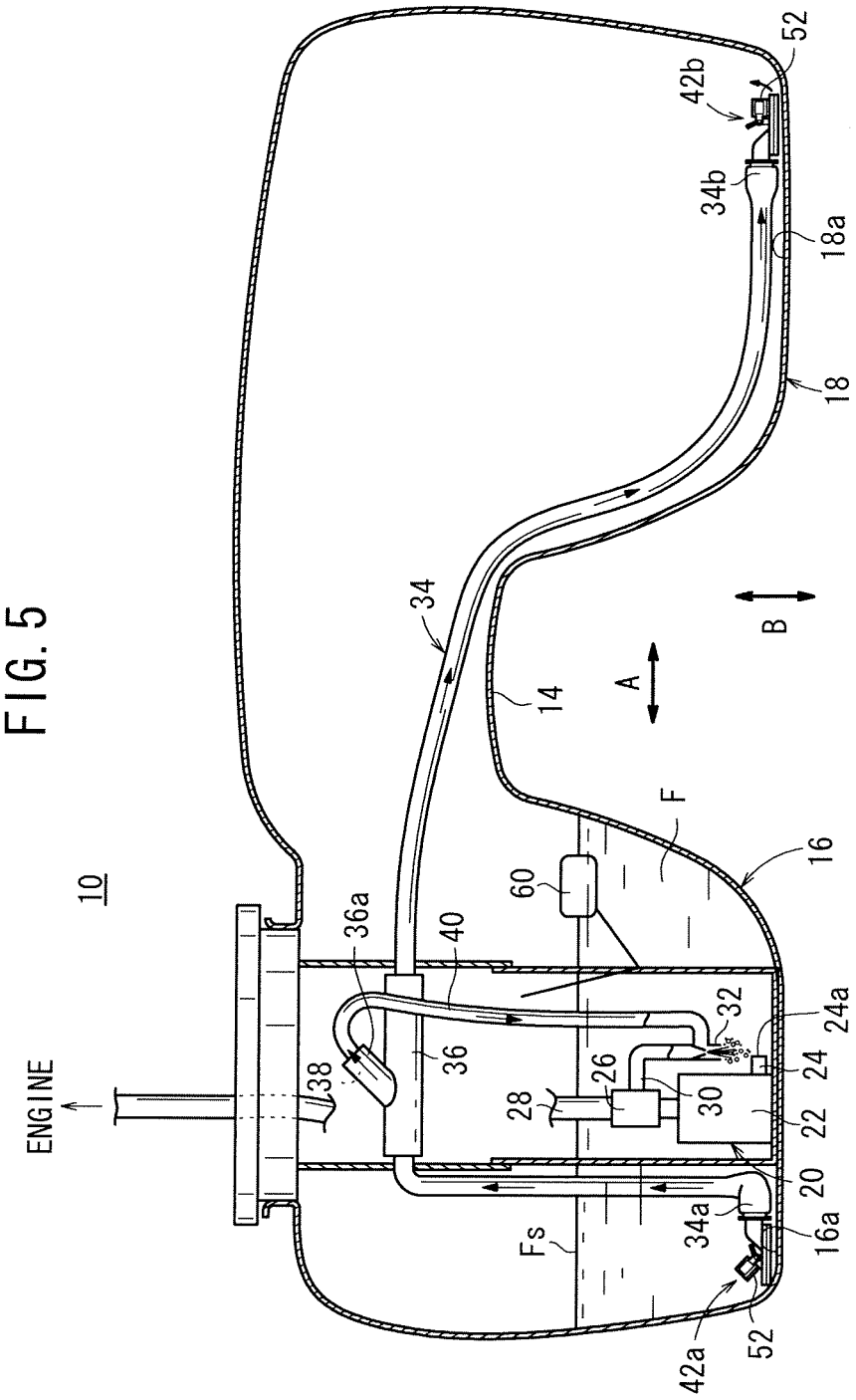
FIG. 5 is a view illustrative of operation of the fuel tank.

The siphon tube 34 has its open end 34a placed in the fuel F stored in the main tank 16 and its other open end 34b placed in the sub-tank 18 which is initially free of the fuel F, with the lid 52 of the fuel introducing member 42b being closed (see FIG. 5).

When the siphon tube 34 is evacuated by the suction jet pump 32, the fuel F which has been drawn from the open end 34a of the siphon tube 34 through the opening 50 of the fuel introducing member 42a and the fuel channel 58 is delivered toward the other open end 34b of the siphon tube 34.

When the open end 34b of the siphon tube 34 is supplied with the fuel F, the lid 52 of the fuel introducing member 42b is opened. The fuel F now flows from the main tank 16 into the sub-tank 18 due to the siphoning function of the siphon tube 34. Therefore, the liquid level Fs of the fuel F in the main tank 16 and the liquid level Fs of the fuel F in the sub-tank 18 are brought into the same height.

According to the first embodiment, the fuel introducing member 42*a* which is connected to the open end 34*a* of the siphon tube 34 is mounted on the bottom of the main tank 16, and has its opening 50 disposed below the upper end of the inner diameter of the open end 34*a* (see FIG. 3).

Consequently, the fuel F can effectively be siphoned until the liquid level Fs becomes lower than the upper end of the inner diameter of the open end 34*a* of the siphon tube 34. The fuel F in the main tank 16 can thus be used efficiently with a simple and economical structure.

Furthermore, the fuel introducing member 42*a*, which is mounted on the bottom of the main tank 16, is capable of effectively siphoning the fuel F stored in the main tank 16 without leaving a large quantity of fuel.

According to the first embodiment, in particular, the fuel introducing member 42*a* is disposed in the main tank 16, and the fuel introducing member 42*b* is disposed in the sub-tank 18. Therefore, any remaining fuel F can efficiently be siphoned from both the main tank 16 and the sub-tank 18.

As shown in FIG. 2, each of the fuel introducing members 42*a*, 42*b* is of a cubic or rectangular parallelepiped shape (hollow three-dimensional shape), which is short in a height direction, and has the opening 50 defined in the upper surface 46*a* and the lid 52 for opening and closing the opening 50. Even in a case where the vehicle is tilted on a slope or the like, its own weight of the lid 52 prevents the lid 52 from swinging in a direction to open the opening 50. In addition, in the fuel introducing members 42*a*, 42*b*, since the lid 52 closes the opening 50, the opening area of the opening 50 can be set to a large size, thereby for protection of the opening 50 against clogging or the like.

Furthermore, the groove 56 is defined in the upper surface 46*a* around the opening 50. When the remaining quantity of the fuel F is reduced and the lid 52 closes the opening 50 under its own weight, the fuel F remains around the opening 50 along the groove 56. As a result, the lid 52 is brought into close contact with the upper surface 46*a*, and thus sealing performance of the opening 50 can be increased easily.

With the fuel introducing members 42*a*, 42*b*, the opening area of the fuel channel 58 is equal to or greater than the opening area of the opening 50. Therefore, no flow resistance is present on the passage from the opening 50 to the fuel channel 58, and thus the fuel F in the main tank 16 and the sub-tank 18 can smoothly flow from the opening 50 to the fuel channel 58.

Moreover, the opening area of the opening 50 and the opening area of the fuel channel 58 are equal to or greater than the opening area of the open ends 34*a*, 34*b* of the siphon tube 34. Consequently, the fuel F can smoothly and reliably flow through the opening 50 and the fuel channel 58 into the siphon tube 34.

Figure 6:
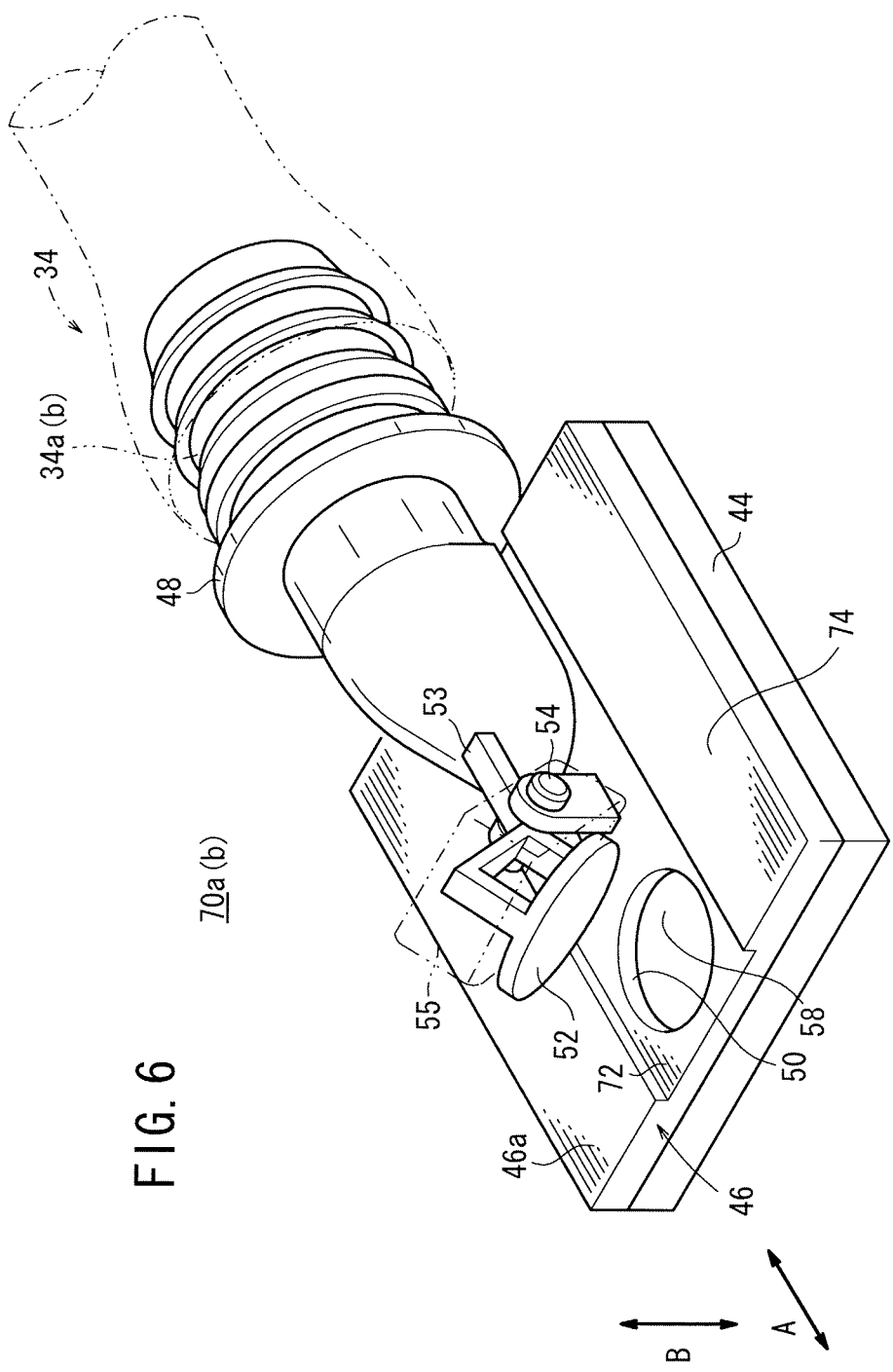
FIG. 6 is a perspective view of each of fuel introducing members of a fuel tank according to a second embodiment of the present invention.

FIG. 6 is a perspective view of each of fuel introducing members 70*a*, 70*b* of a fuel tank according to a second embodiment of the present invention.

Those parts of the fuel tank according to the second embodiment which are identical to those of the fuel tank 10 according to the first embodiment are denoted by identical reference characters, and will not be described below. Those parts of fuel tanks according to third and subsequent embodiments which are identical to those of the fuel tank 10 according to the first embodiment are also denoted by identical reference characters, and will not be described below.

The upper surface 46*a* of the cover 46 of each of the fuel introducing members 70*a*, 70*b* has a first region 72 including the opening 50 and a second region 74 excluding the opening 50. The first region 72 is at a level lower than the second region 74.

According to the second embodiment, when the remaining quantity of the fuel F is reduced and the lid 52 closes the opening 50 under its own weight, since the first region 72 including the opening 50 is at a level lower than the second region 74, the fuel F tends to remain in the first region 72. Therefore, when the lid 52 closes the opening 50, the remaining fuel F performs a sealing function to cause the lid 52 to close the opening 50 reliably.

Figure 7:
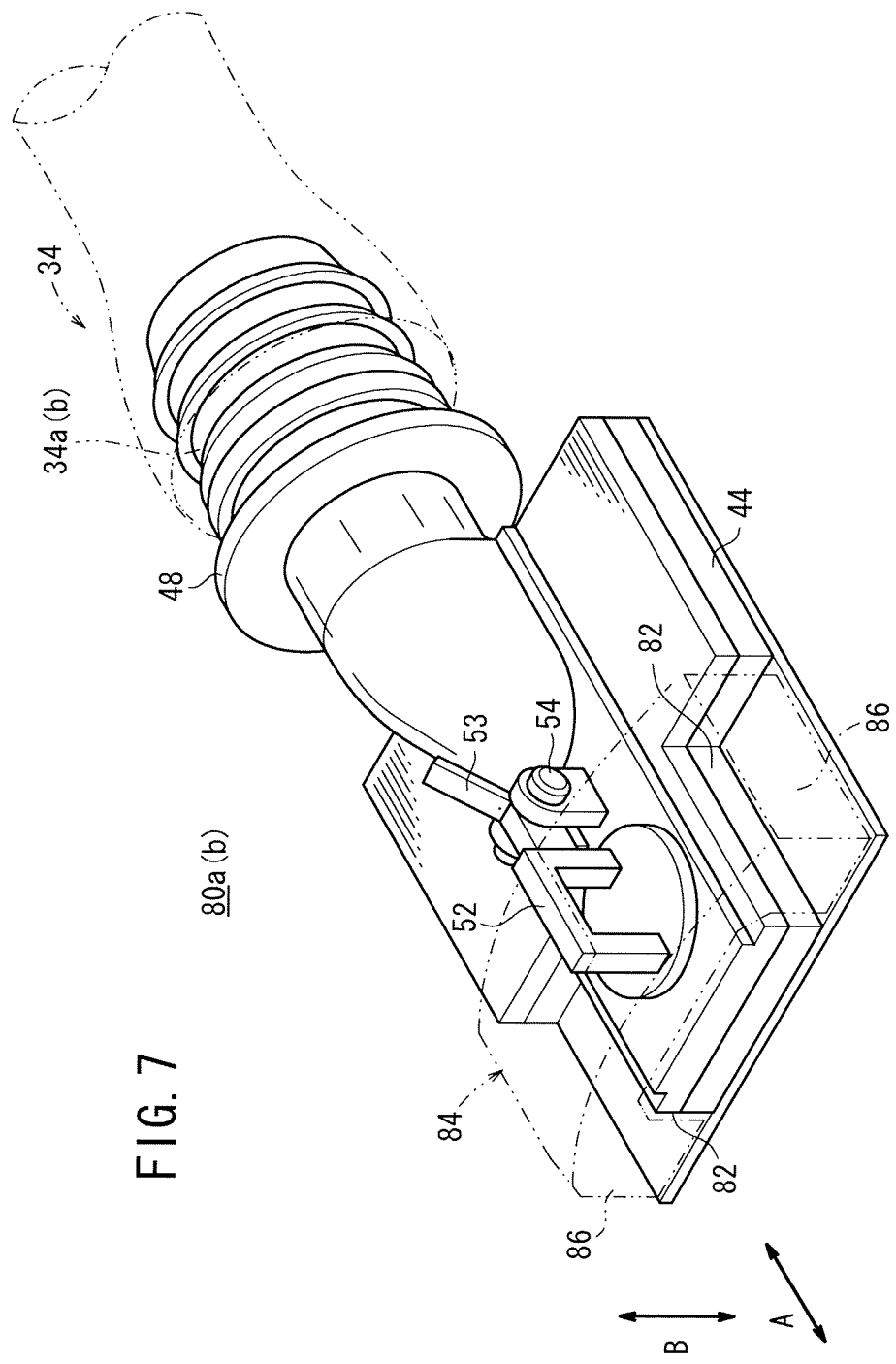
FIG. 7 is a perspective view of each of fuel introducing members of a fuel tank according to a third embodiment of the present invention.
Figure 8:
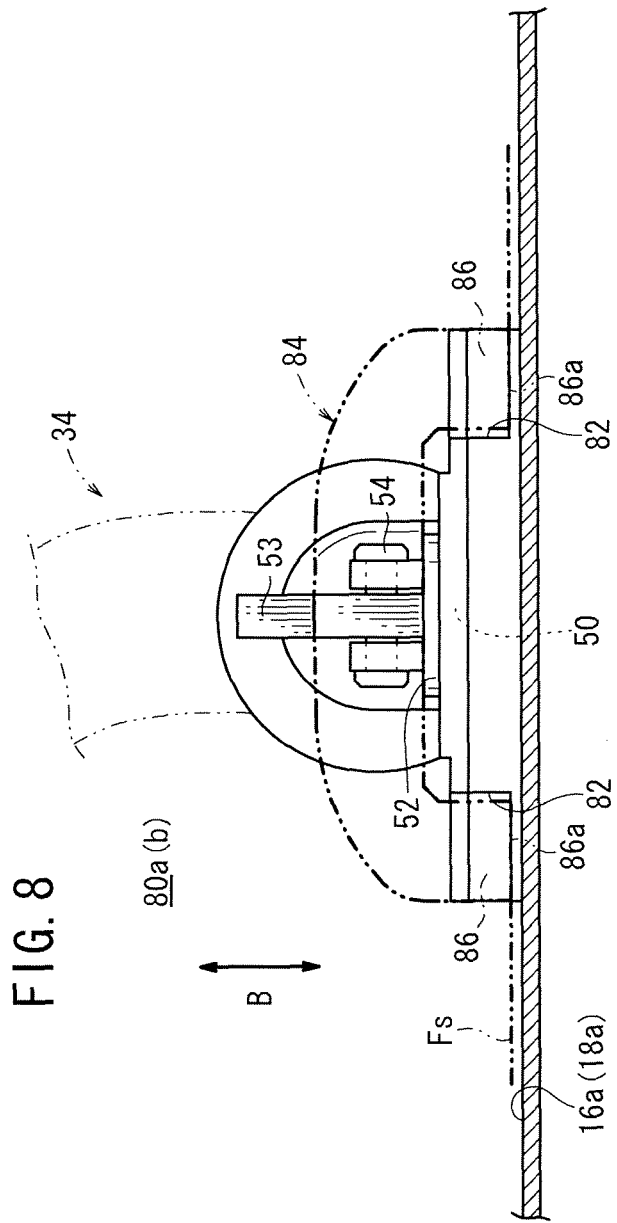
FIG. 8 is a front elevational view of the fuel introducing member.

FIG. 7 is a perspective view of each of fuel introducing members 80*a*, 80*b* of a fuel tank according to a third embodiment of the present invention. FIG. 8 is a front elevational view of each of the fuel introducing members 80*a*, 80*b*.

Each of the fuel introducing members 80*a*, 80*b* has recesses 82 defined at both sides of the lid 52, and a float (floating member) 84 is mounted on the lid 52. The float 84 includes projections 86 projecting downwardly into the respective recesses 82. The projections 86 have respective lower end faces 86*a* which are at a level lower than the opening 50 (see FIG. 8).

According to the third embodiment, the lower end faces 86*a* which are positioned at the lower end of the float 84 are at a level lower than the opening 50. Therefore, even in a case where the liquid level Fs of the fuel F is at a considerably low level, the float 84 exerts buoyant force thereby to open the opening 50.

Even when the liquid level Fs is lowered to a level that is close to the opening 50 as much as possible, therefore, the opening 50 is reliably opened thereby to make it possible to draw in the fuel F. As a result, the fuel F that remains in the tank can thus be further reduced for easily achieving efficient use of the fuel F.

Figure 9:
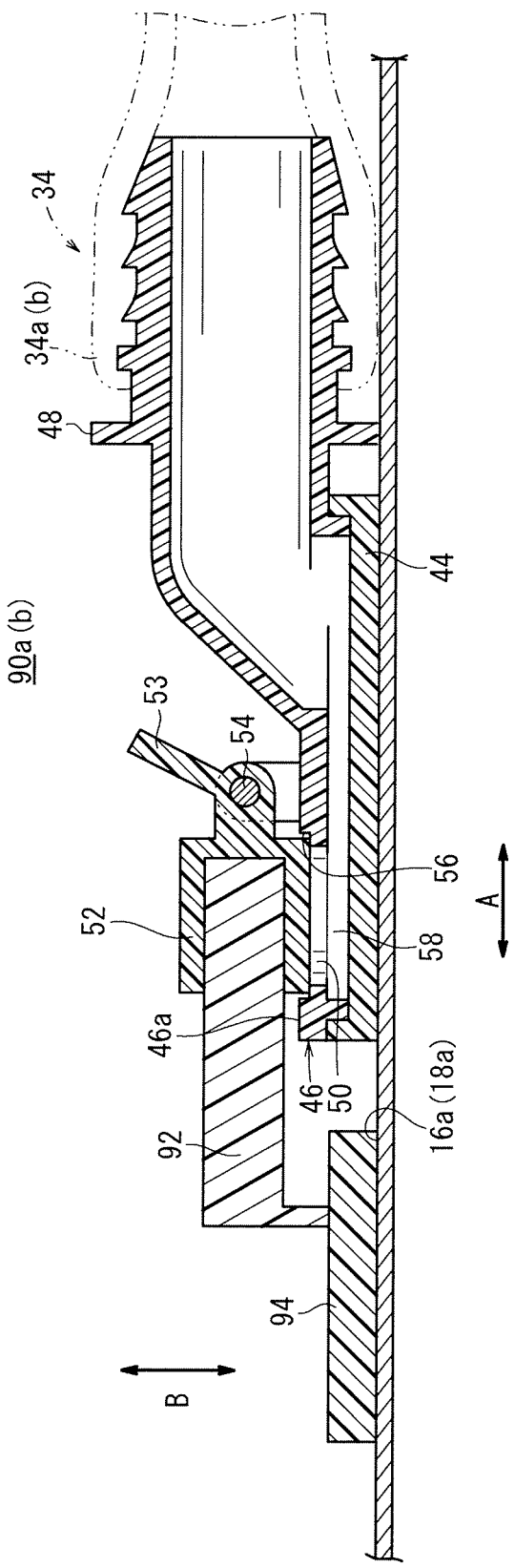
FIG. 9 is a sectional side elevational view of each of fuel introducing members of a fuel tank according to a fourth embodiment of the present invention.

FIG. 9 is a sectional side elevational view of each of fuel introducing members 90*a*, 90*b* of a fuel tank according to a fourth embodiment of the present invention.

Each of the fuel introducing members 90*a*, 90*b* includes a float (floating member) 94 mounted on the lid 52 by a joint member 92. The float 94 has a lower end positioned below the opening 50.

According to the fourth embodiment, the position where the lid 52 is opened by the float 94 can be set as low as possible. Therefore, the fourth embodiment offers the same advantages as with the third embodiment, e.g., the fourth embodiment is efficient in that the remaining amount of the fuel F can be suitably reduced.

Figure 10:
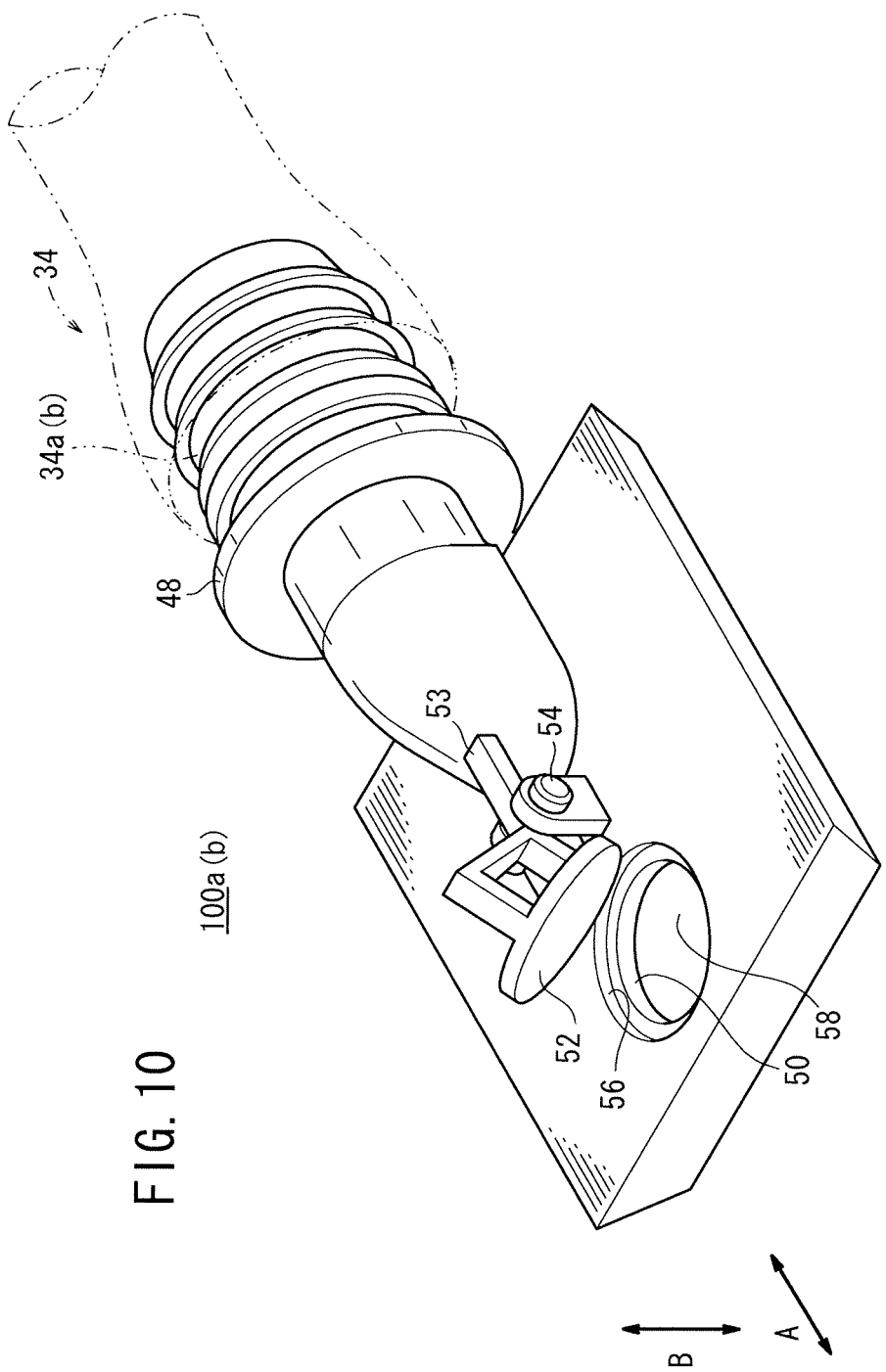
FIG. 10 is a perspective view of each of fuel introducing members of a fuel tank according to a fifth embodiment of the present invention.

FIG. 10 is a perspective view of each of fuel introducing members 100*a*, 100*b* of a fuel tank according to a fifth embodiment of the present invention.

Each of the fuel introducing members 100*a*, 100*b* is of an inverted trapezoidal shape (hollow three-dimensional shape) as viewed in front elevation with a narrower lower end, and includes an opening 50 defined in an upper surface thereof and a lid 52 for opening and closing the opening 50.

Figure 11:
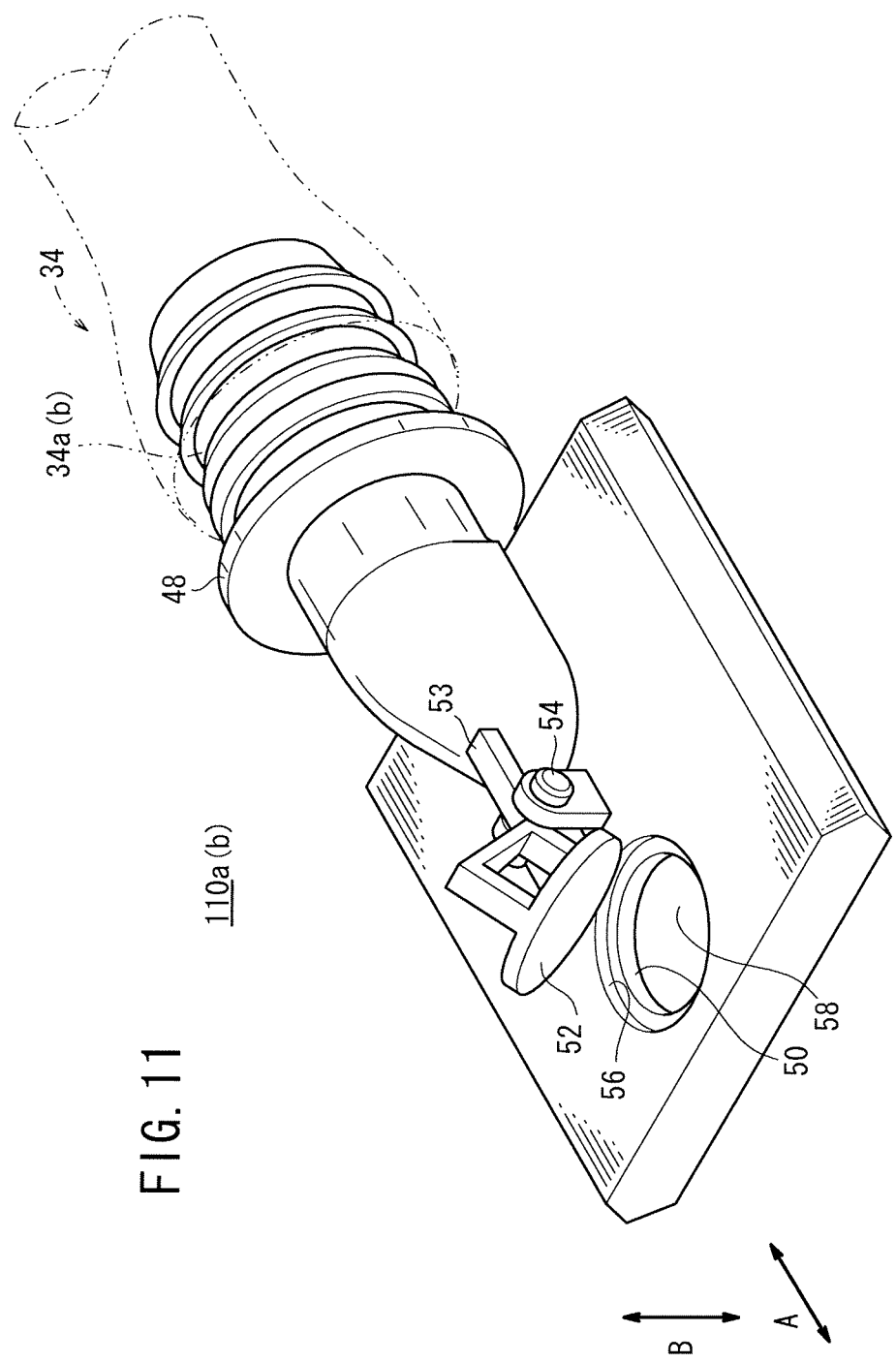
FIG. 11 is a perspective view of each of fuel introducing members of a fuel tank according to a sixth embodiment of the present invention.

FIG. 11 is a perspective view of each of fuel introducing members 110*a*, 110*b* of a fuel tank according to a sixth embodiment of the present invention.

Each of the fuel introducing members 110*a*, 110*b* is of a hexagonal shape (hollow three-dimensional shape) as viewed in front elevation with widthwise opposite sides projecting outwardly in a dogleg shape, and includes an opening 50 defined in an upper surface thereof and a lid 52 for opening and closing the opening 50.

Figure 12:
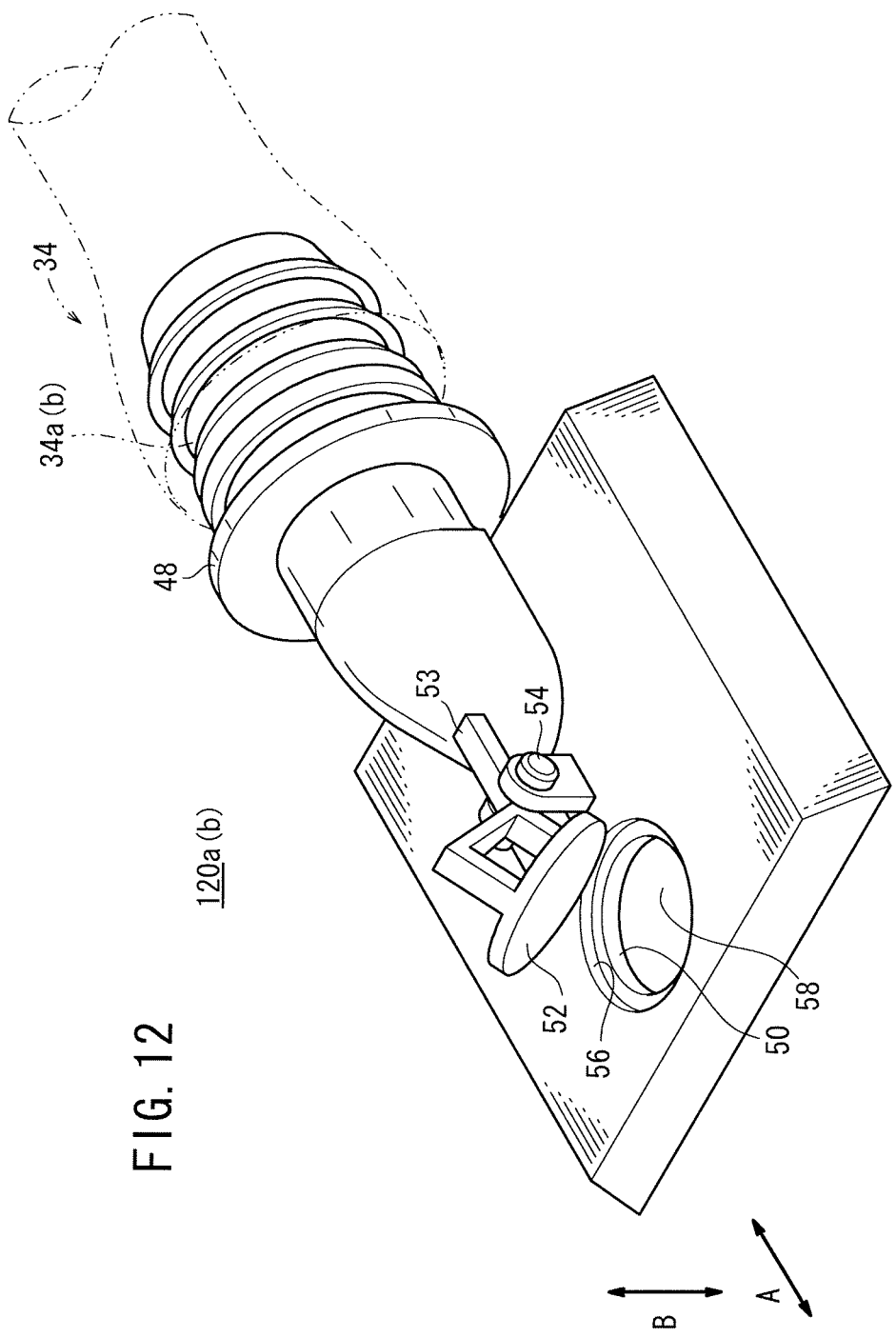
FIG. 12 is a perspective view of each of fuel introducing members of a fuel tank according to a seventh embodiment of the present invention.

FIG. 12 is a perspective view of each of fuel introducing members 120*a*, 120*b* of a fuel tank according to a seventh embodiment of the present invention.

Each of the fuel introducing members 120*a*, 120*b* is of a trapezoidal shape (hollow three-dimensional shape) as viewed in front elevation with a wider lower end, and includes an opening 50 defined in an upper surface thereof and a lid 52 for opening and closing the opening 50.

Figure 13:
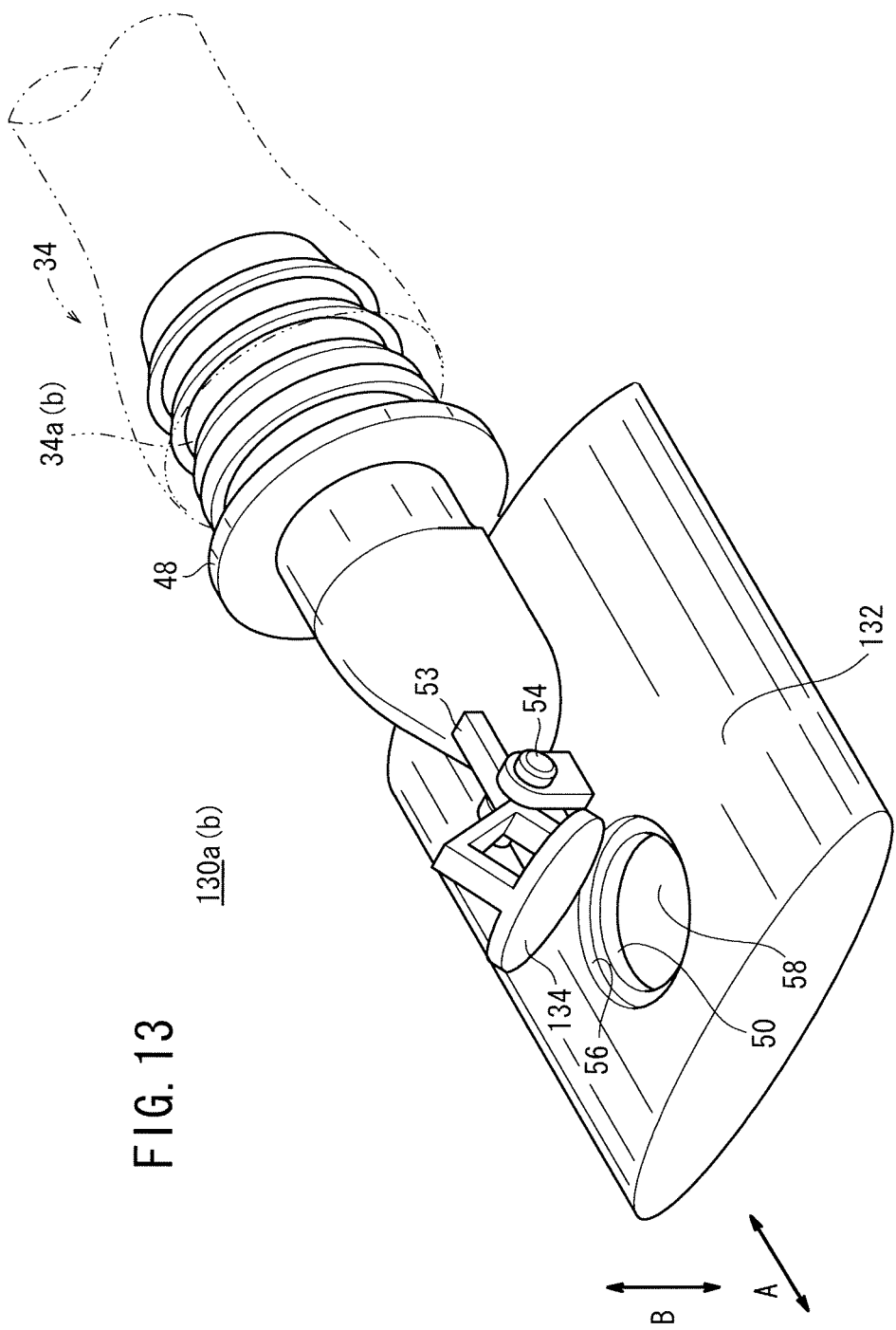
FIG. 13 is a perspective view of each of fuel introducing members of a fuel tank according to an eighth embodiment of the present invention.

FIG. 13 is a perspective view of each of fuel introducing members 130a, 130b of a fuel tank according to an eighth embodiment of the present invention.

Each of the fuel introducing members 130a, 130b is of an elliptical shape (hollow three-dimensional shape) as viewed in front elevation which is elongate transversely, and has an opening 50 defined in a curved upper surface 132 thereof and a lid 134 for opening and closing the opening 50. The lid 134 has a curved surface which corresponds to the curved upper surface 132.

Alternatively, each of the fuel introducing members 130a, 130b may have a flat upper surface instead of the curved upper surface 132, and also have an opening 50 defined in the flat upper surface thereof and a lid 52 for opening and closing the opening 50. This holds true for ninth and subsequent embodiments to be described below.

Figure 14:
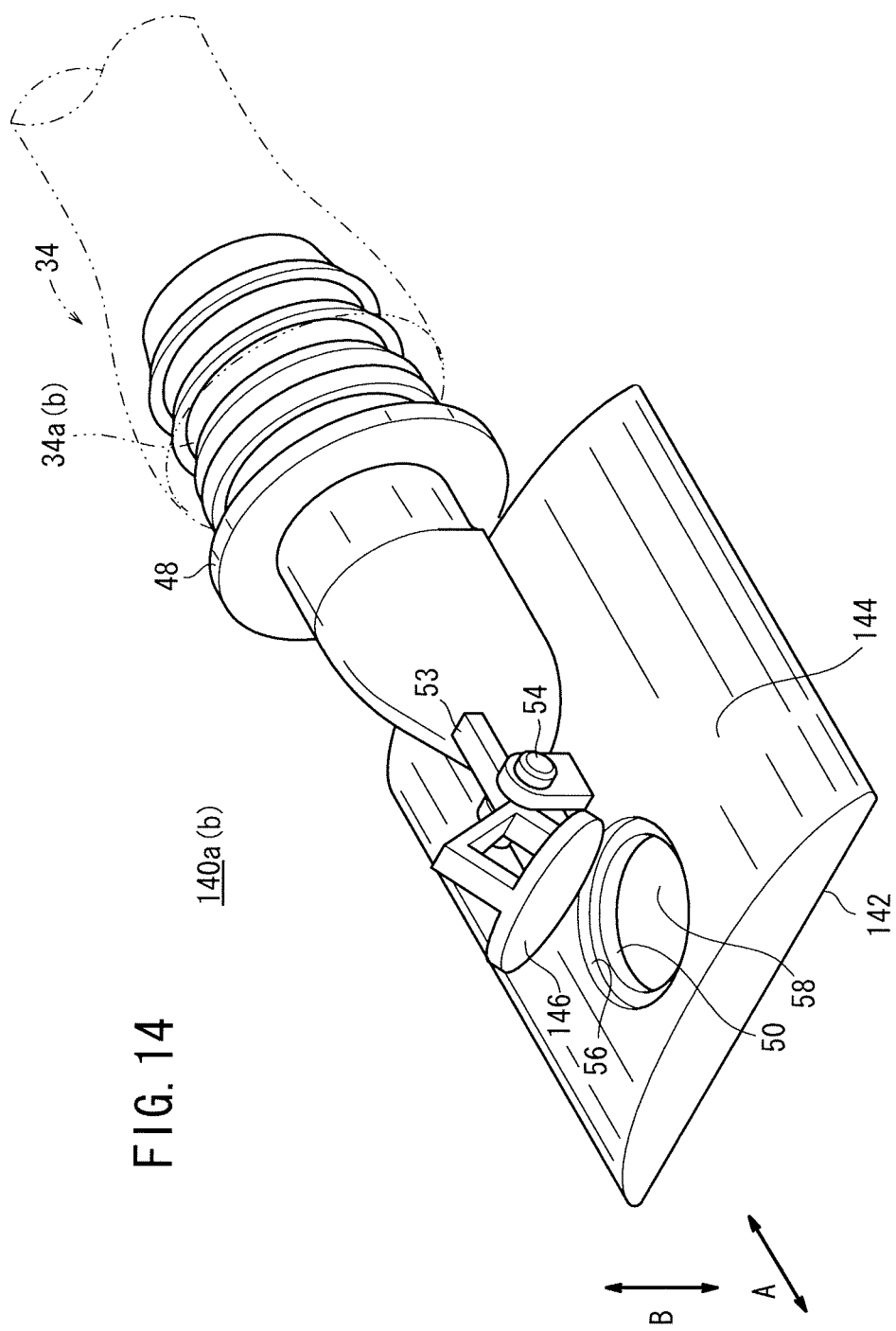
FIG. 14 is a perspective view of each of fuel introducing members of a fuel tank according to a ninth embodiment of the present invention.

FIG. 14 is a perspective view of each of fuel introducing members 140a, 140b of a fuel tank according to a ninth embodiment of the present invention.

Each of the fuel introducing members 140a, 140b is of an upper semicircular shape (hollow three-dimensional shape) as viewed in front elevation with a flat bottom surface 142, and has an opening 50 defined in a curved upper surface 144 thereof and a lid 146 for opening and closing the opening 50. The lid 146 has a curved surface which corresponds to the curved upper surface 144.

Figure 15:
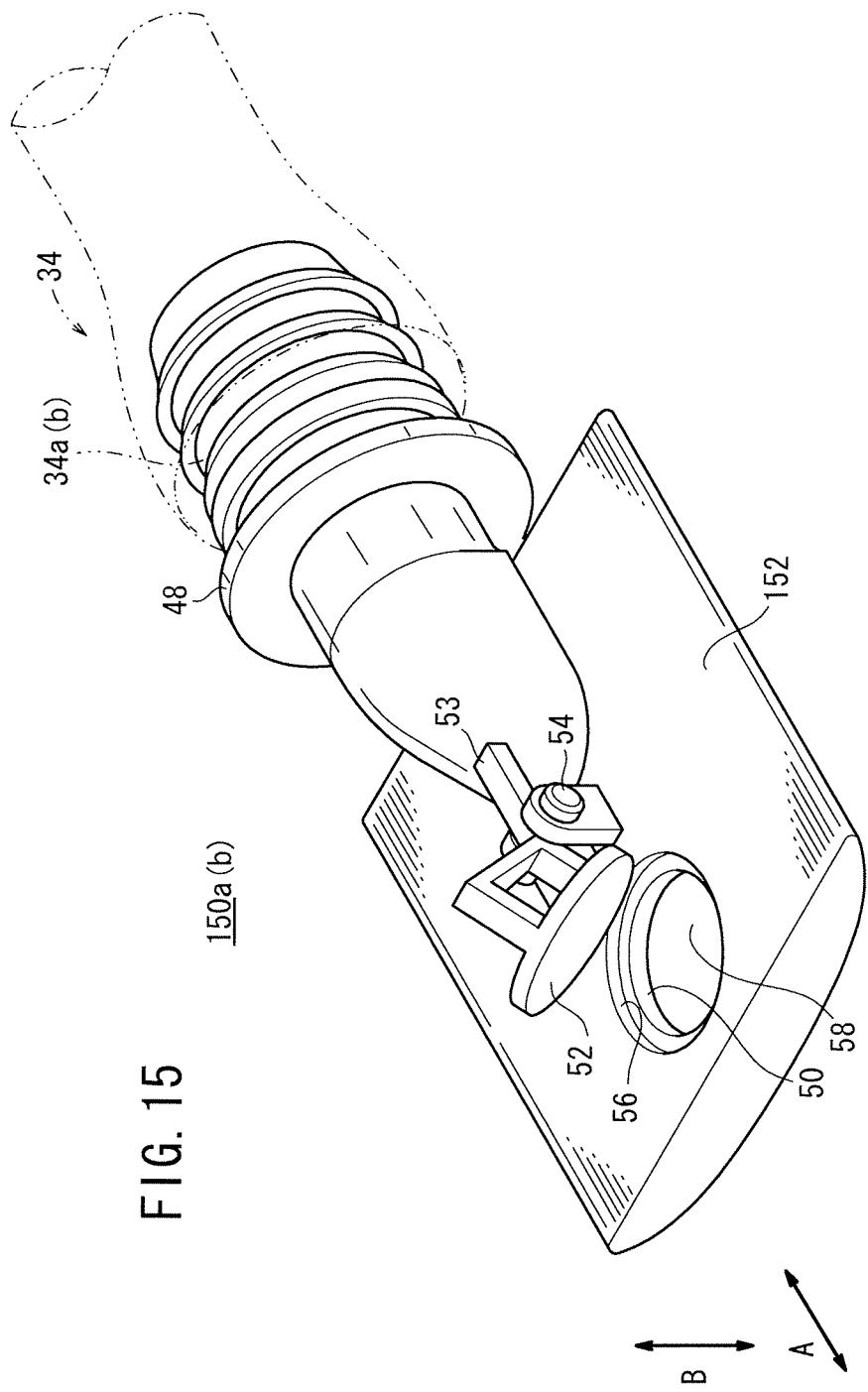
FIG. 15 is a perspective view of each of fuel introducing members of a fuel tank according to a tenth embodiment of the present invention.

FIG. 15 is a perspective view of each of fuel introducing members 150a, 150b of a fuel tank according to a tenth embodiment of the present invention.

Each of the fuel introducing members 150a, 150b is of a lower semicircular shape (hollow three-dimensional shape) as viewed in front elevation with a flat upper surface 152, and has an opening 50 defined in the upper surface 152 thereof and a lid 52 for opening and closing the opening 50.

Figure 16:
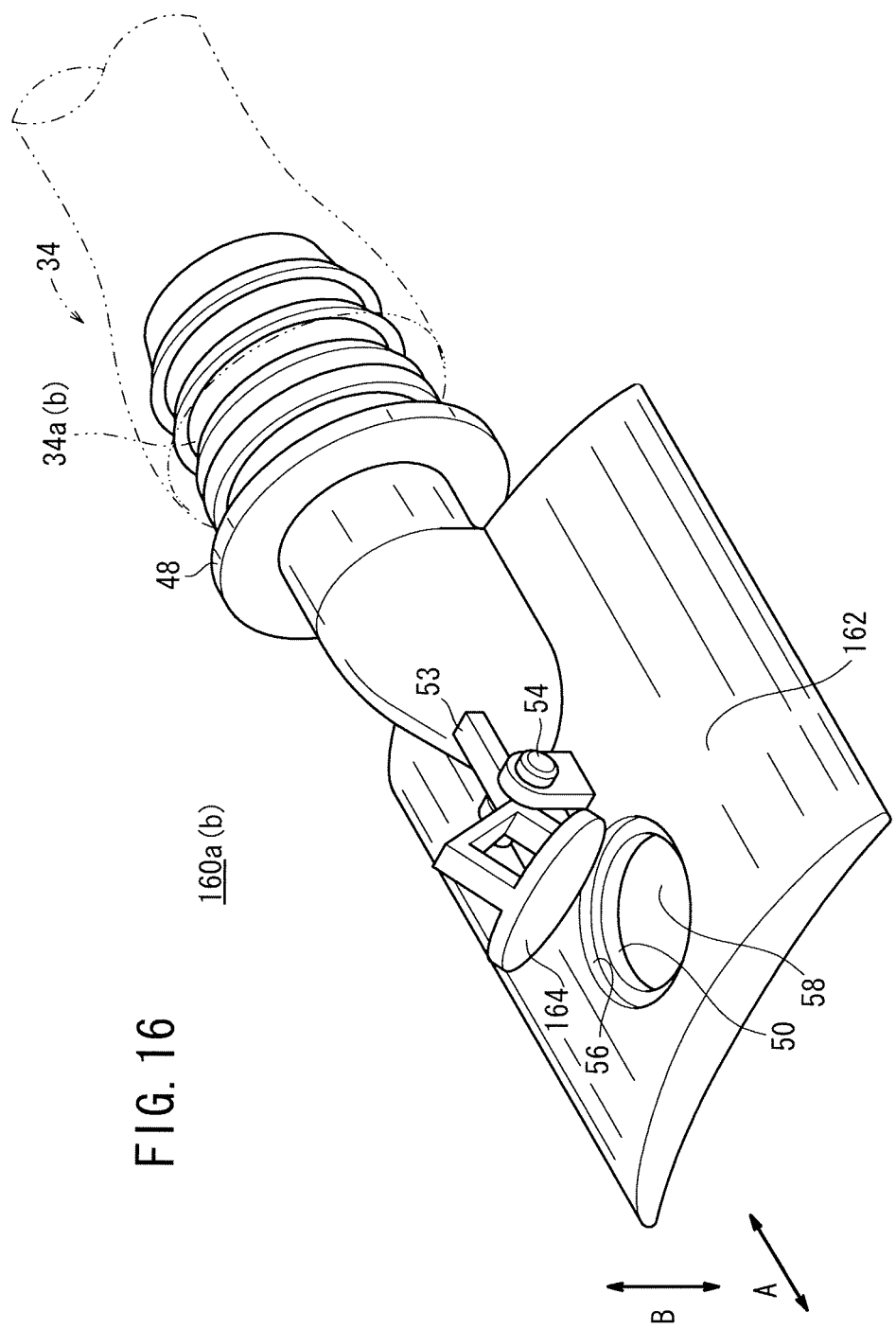
FIG. 16 is a perspective view of each of fuel introducing members of a fuel tank according to an eleventh embodiment of the present invention.

FIG. 16 is a perspective view of each of fuel introducing members 160a, 160b of a fuel tank according to an eleventh embodiment of the present invention.

Each of the fuel introducing members 160a, 160b is of a crescent shape (hollow three-dimensional shape) as viewed in front elevation which is curved upwardly (lower chord), and has an opening 50 defined in a curved upper surface 162 thereof and a lid 164 for opening and closing the opening 50. The lid 164 has a curved surface which corresponds to the curved upper surface 162.

Figure 17:
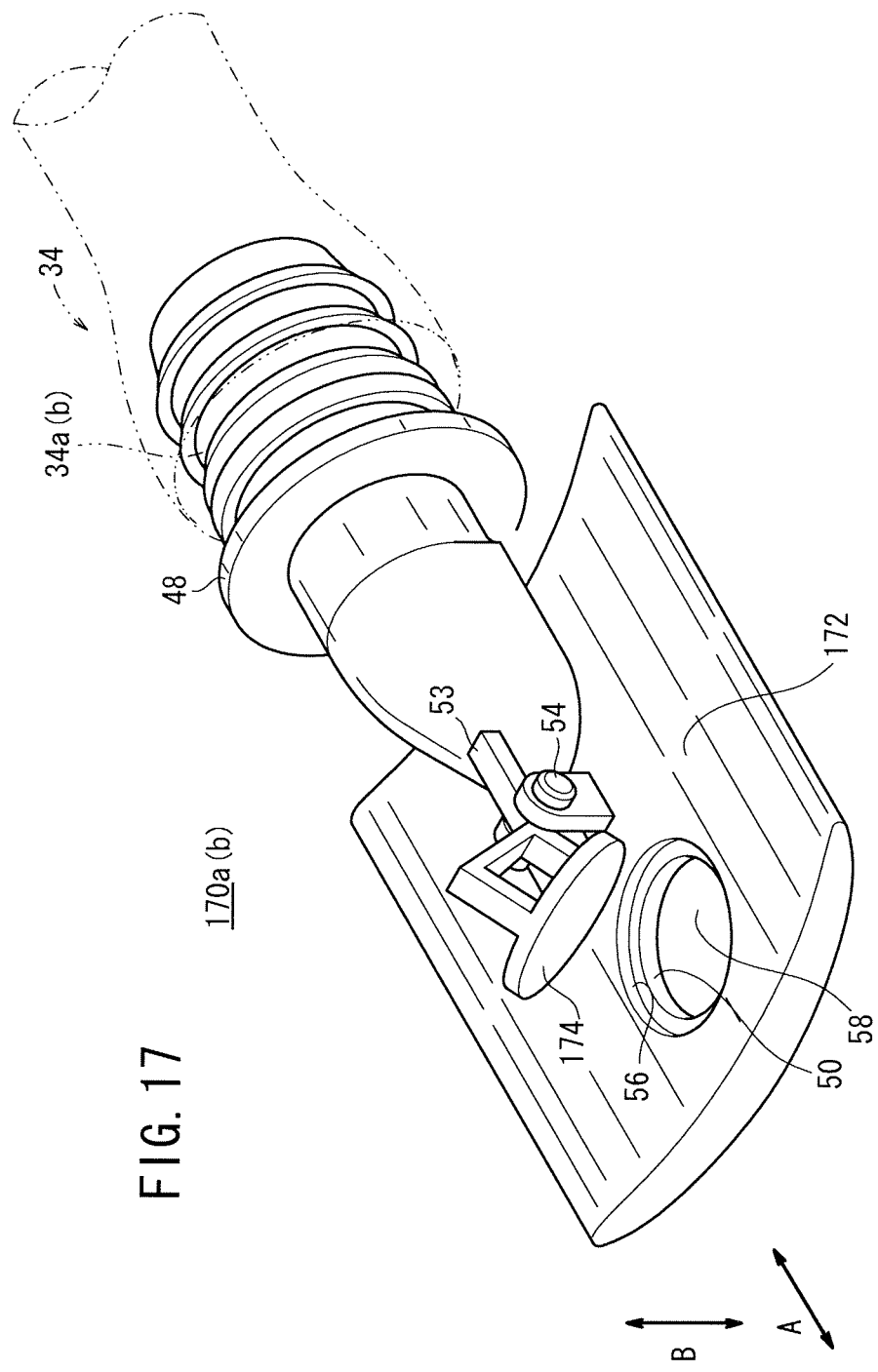
FIG. 17 is a perspective view of each of fuel introducing members of a fuel tank according to a twelfth embodiment of the present invention.
Figure 18:
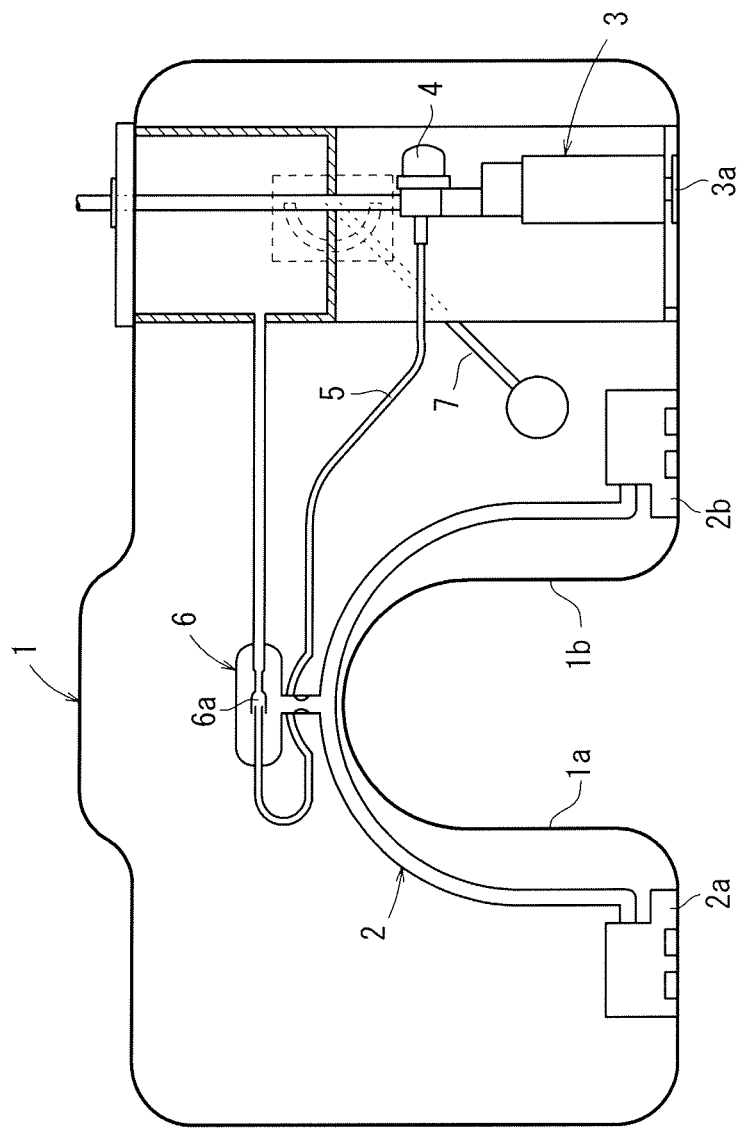
FIG. 18 is a view showing a fuel tank level equalizer system according to a conventional art.

FIG. 17 is a perspective view of each of fuel introducing members 170a, 170b of a fuel tank according to a twelfth embodiment of the present invention.

Each of the fuel introducing members 170a, 170b is of a crescent shape (hollow three-dimensional shape) as viewed in front elevation which is curved downwardly (upper chord), and has an opening 50 defined in a concave upper surface 172 thereof and a lid 174 for opening and closing the opening 50. The lid 174 has a concave surface which corresponds to the concave upper surface 172.

The fifth through twelfth embodiments are set to various shapes, and essentially offer the same advantages as with the first through fourth embodiments.

The invention claimed is:

1. A fuel tank including:
a first reservoir for storing fuel;
a second reservoir for storing the fuel; and
a siphon tube which extends between the first reservoir and the second reservoir and which is evacuated by a negative pressure generator; said siphon tube having at least one open end disposed in one of the first reservoir and the second reservoir;
the fuel tank comprising:
a fuel introducing member, an upper surface of the fuel introducing member being connected to said at least one open end of the siphon tube;
wherein the fuel introducing member comprises:
a base assembly having an opening defined in the upper surface thereof for introducing the fuel therethrough; and
a lid closing the opening under its own weight of the lid when the opening is positioned above the liquid level of the fuel,
wherein the fuel introducing member is of a three-dimensional shape which is short in a height direction compared to width and length directions thereof;
wherein an axis of said opening formed in the base assembly is parallel to the height direction of the fuel introducing member;
wherein said at least one open end of the siphon tube is oriented substantially parallel to a bottom surface of said one of the first reservoir and the second reservoir; and
wherein the opening formed in said base assembly is disposed below an upper end portion and above a lower end portion of the at least one open end of the siphon tube.

2. The fuel tank according to claim 1, wherein the lid includes a floating member mounted thereof for exerting buoyant force to float the lid in the fuel, said floating member being formed separately from said lid; and
the floating member has a lower end which is positioned below the opening when the lid closes the opening.

3. The fuel tank according to claim 1, wherein said base assembly comprises a cover member including a joint formed integrally therewith; and
wherein said at least one open end is connected to said joint.

4. A fuel tank including
a first reservoir for storing fuel;
a second reservoir for storing the fuel; and
a siphon tube which extends between the first reservoir and the second reservoir and which is evacuated by a negative pressure generator; said siphon tube having at least one open end disposed in one of the first reservoir and the second reservoir;
the fuel tank comprising:
a fuel introducing member, an upper surface of the fuel introducing member being connected to said at least one open end of the siphon tube;
wherein the fuel introducing member comprises:
a base assembly having an opening defined in the upper surface of the fuel introducing member for introducing the fuel therethrough; and
a lid closing the opening under its own weight of the lid when the opening is positioned above the liquid level of the fuel;
wherein:
the fuel introducing member is of a three-dimensional shape which is short in a height direction;
said at least one open end of the siphon tube is oriented substantially parallel to a bottom surface of said one of the first reservoir and the second reservoir; and
said base assembly including the opening is disposed below an upper end portion of the at least one open end of the siphon tube;
the lid includes a floating member mounted thereof for exerting buoyant force to float the lid in the fuel;

the floating member has a lower end which is positioned below the opening when the lid closes the opening;

said base assembly has recesses defined therein at both sides of the lid; and said floating member includes projections projecting downwardly into said respective recesses.

5. A fuel tank comprising:

a first reservoir for storing fuel;

a second reservoir for storing the fuel;

a siphon tube having a first open end thereof disposed in the first reservoir and a second open end thereof disposed in the second reservoir;

a pair of fuel introducing members, each connected to respective one of said first open end and said second open end of the siphon tube;

each of said fuel introducing members comprising a base member;

a cover member disposed on the base member, and having an opening formed therein for introducing the fuel therethrough;

a lid closing the opening when the opening is positioned above the liquid level of the fuel; and a floating member attached to said lid;

wherein said base member and cover member have recesses defined therein at both sides of the lid;

wherein said floating member includes projections projecting downwardly into said respective recesses;

wherein each of said first and second open ends of the siphon tube is oriented substantially parallel to a bottom surface of respective one of said first reservoir and said second reservoir; and wherein said cover member including the opening is disposed below an upper end portion of the respective one of said first open end and said second open end of the siphon tube.

* * * * *